US006145554A

United States Patent [19]

Hightower

[11] Patent Number: 6,145,554

[45] Date of Patent: Nov. 14, 2000

[54] AUTOMATIC SPINDLE MAKING DEVICE

[76] Inventor: Herman Hightower, 50030 Wind Rush Trail, Aberdeen, Miss. 39730

[21] Appl. No.: 09/124,731

[22] Filed: Jul. 30, 1998

[51] Int. Cl.[7] .......... B23B 3/28

[52] U.S. Cl. .......... 142/37; 142/21; 142/39; 142/38; 142/43; 82/118; 82/119; 82/152; 82/155

[58] Field of Search .......... 142/37, 21, 39, 142/38, 43; 82/1.11, 11.3, 119, 152, 118, 151, 155

[56] References Cited

U.S. PATENT DOCUMENTS

| | | | |
|---|---|---|---|
| 3,140,626 | 7/1964 | Davies, Jr. | 82/1 |
| 4,611,644 | 9/1986 | Larson | 142/7 |
| 4,627,477 | 12/1986 | Wise | 142/7 |
| 4,827,814 | 5/1989 | Wilkins | 82/1.11 |
| 5,099,728 | 3/1992 | Thiem | 82/112 |
| 5,486,076 | 1/1996 | Hauschopp | 409/179 |
| 5,520,493 | 5/1996 | Cucchi | 414/18 |
| 5,526,725 | 6/1996 | Tremaglio et al. | 82/1.11 |
| 5,765,455 | 6/1998 | Muhlnickel | 82/1.11 |
| 5,946,992 | 9/1999 | Ozawa | 82/48 |

*Primary Examiner*—Lee Young
*Assistant Examiner*—Minh Trinh

[57] ABSTRACT

An automatic lathe is provided including a table stand having a top with a plurality of legs coupled thereto and extending downwardly therefrom. A pair of spindle spinning assemblies are positioned on the top of the table stand. Each spindle spinning assembly has a securement rod rotatably mounted thereon which is adapted to releasably secure to an end of a spindle for spinning the same. A carriage assembly is adapted to slide between each spindle spinning assembly. The carriage assembly has a blade mechanism mounted thereon for engaging a front surface of the spindle secured between the spindle assemblies. The carriage assembly further includes a carriage motor functioning to move the carriage in a forward direction upon the receipt of a forward signal and move the carriage in a reverse direction upon the receipt of a reverse signal only when the carriage motor is actuated. Finally, a reverse direction mechanism serves to transmit the forward signal to the carriage motor when the carriage is moving in a reverse direction and reaches a first end of the top of the table stand. Further, the reverse direction mechanism transmits the reverse signal to the carriage motor when the carriage is moving in a forward direction and reaches a second end of the top of the table stand.

17 Claims, 3 Drawing Sheets

AUTOMATIC SPINDLE MAKING DEVICE

BACKGROUND OF THE INVENTION

1. Field of the Invention

The present invention relates to lathes and more particularly pertains to a new automatic spindle making device for automatically making a spindle.

2. Description of the Prior Art

The use of lathes is known in the prior art. More specifically, lathes heretofore devised and utilized are known to consist basically of familiar, expected and obvious structural configurations, notwithstanding the myriad of designs encompassed by the crowded prior art which have been developed for the fulfillment of countless objectives and requirements.

Known prior art lathes include U.S. Pat. No. 4,694,713; U.S. Pat. No. 5,065,801; U.S. Pat. No. 4,627,477; U.S. Pat. No. 4,000,766; U.S. Pat. No. 5,139,060; and U.S. Pat. No. Des. 338,475.

In these respects, the automatic spindle making device according to the present invention substantially departs from the conventional concepts and designs of the prior art, and in so doing provides an apparatus primarily developed for the purpose of automatically making a spindle.

SUMMARY OF THE INVENTION

In view of the foregoing disadvantages inherent in the known types of lathes now present in the prior art, the present invention provides a new automatic spindle making device construction wherein the same can be utilized for automatically making a spindle.

The general purpose of the present invention, which will be described subsequently in greater detail, is to provide a new automatic spindle making device apparatus and method which has many of the advantages of the lathes mentioned heretofore and many novel features that result in a new automatic spindle making device which is not anticipated, rendered obvious, suggested, or even implied by any of the prior art lathes, either alone or in any combination thereof.

To attain this, the present invention generally comprises a table stand having a rectangular planar top with a plurality of legs coupled thereto and extending downwardly therefrom. As shown in FIG. 1, each leg has a wheel assembly pivotally mounted to a bottom thereof. Also included is a pair of spindle spinning assemblies positioned on opposite ends of the top of the table stand. Each spindle spinning assembly has a securement rod rotatably mounted thereon. During use, such securement rod is adapted to releasably secure to an end of a spindle for spinning the same. With reference still to FIG. 1, a vibration damping assembly is provided including an elongated linear arm having a first end pivotally coupled to the top of the table stand. A second end of the arm has a member coupled thereto and extending downwardly therefrom in perpendicular relationship therewith. The member has a bottom end with two pairs of wheels rotatably mounted thereon. Each pair of wheels are spaced from the other pair of wheels and further define a groove. During use, the arm may be lowered such that the groove of each pair of wheels receives the spindle and a weight of the arm damps vibration. It should be noted that each wheel of the vibration damping assembly has a thick soft rubber coating. Such coating functions for further damping vibration and accepting a spindle with an initial generally square cross-section. Further provided is a carriage assembly adapted to slide on at least one elongated bar extending between each spindle spinning assembly. The carriage assembly has a blade mechanism slidably mounted thereon for engaging a front surface of the spindle secured between the spindle assemblies. In operation, the blade mechanism is adapted to slide along an axis perpendicular with respect to the bar and direction of motion associated with the carriage assembly. An spring is mounted between the carriage assembly and the blade mechanism such that the blade mechanism is continuously urged toward the spindle. The carriage assembly further includes a carriage motor adapted to move the carriage by way of a pulley. In use, the carriage motor moves the blade mechanism in a forward direction upon the receipt of a forward signal. Upon the receipt of a reverse signal, the motor moves the carriage in a reverse direction. It should be understood that the carriage motor only effects movement when the carriage motor is actuated. FIG. 1 further shows a Plexiglas planar template having a pair of curvilinear elongated side edges defining an outline of a unique spindle. The template is mounted in spaced horizontal orientation with respect to the top of the table stand such that an inboard end of the blade mechanism is in abutment with one the side edges of the template. Such abutments effects the distancing of the blade mechanism from the spindle in accordance with the outline of the side edge as the carriage assembly moves therealong. The template is removable and may be remounted so that another one of the side edges may be placed in operative sliding abutment with blade mechanism of the carriage assembly. As such, each template is capable of being forming spindles of two unique designs. Also included is a reverse direction means located at opposite ends of the top of the table stand in line with the carriage assembly. During operation, the reverse direction means serves to transmit the forward signal to the carriage motor when the carriage is moving in a reverse direction and reaches a first end of the top of the table stand. In addition, the reverse direction means transmits the reverse signal to the carriage motor when the carriage is moving in a forward direction and reaches a second end of the top of the table stand. For controlling the distance between the spindle and blade mechanism, an indexing assembly is provided. Such indexing assembly includes a multi-position solenoid fixedly mounted on the carriage assembly and in abutment with the blade mechanism. The solenoid is adapted for indexing the blade mechanism away from the spindle a predetermined distance upon the receipt of an index away signal. Upon the receipt of an index toward signal, the solenoid indexes the blade mechanism toward the spindle the predetermined distance. For providing fully automatic operation, an index toward signal is transmitted to the indexing assembly upon every transmission of at least one of the forward and reverse signal to the carriage motor, as when the carriage reverses direction. Finally, a cut off switch is mounted on the top of the table stand adjacent to one of the ends thereof. The cut off switch is adapted to deactuate the carriage motor and the spinning assemblies upon the abutment thereof with the blade mechanism when the blade mechanism resides in constant abutment with a full length of the template.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new automatic spindle making device apparatus and method which has many of the advantages of the lathes mentioned heretofore and many novel features that result in a new automatic spindle making device which is not anticipated, rendered obvious, suggested, or even implied by any of the prior art lathes, either alone or in any combination thereof.

It is another object of the present invention to provide a new automatic spindle making device which may be easily and efficiently manufactured and marketed.

It is a further object of the present invention to provide a new automatic spindle making device which is of a durable and reliable construction.

An even further object of the present invention is to provide a new automatic spindle making device which is susceptible of a low cost of manufacture with regard to both materials and labor, and which accordingly is then susceptible of low prices of sale to the consuming public, thereby making such automatic spindle making device economically available to the buying public.

Still yet another object of the present invention is to provide a new automatic spindle making device which provides in the apparatuses and methods of the prior art some of the advantages thereof, while simultaneously overcoming some of the disadvantages normally associated therewith.

Still another object of the present invention is to provide a new automatic spindle making device for automatically making a spindle.

Even still another object of the present invention is to provide a new automatic spindle making device that includes a table stand having a top with a plurality of legs coupled thereto and extending downwardly therefrom. A pair of spindle spinning assemblies are positioned on the top of the table stand. Each spindle spinning assembly has a securement rod rotatably mounted thereon which is adapted to releasably secure to an end of a spindle for spinning the same. A carriage assembly is adapted to slide between each spindle spinning assembly. The carriage assembly has a blade mechanism mounted thereon for engaging a front surface of the spindle secured between the spindle assemblies. The carriage assembly further includes a carriage motor functioning to move the carriage in a forward direction upon the receipt of a forward signal and move the carriage in a reverse direction upon the receipt of a reverse signal only when the carriage motor is actuated. Finally, a reverse direction mechanism serves to transmit the forward signal to the carriage motor when the carriage is moving in a reverse direction and reaches a first end of the top of the table stand. Further, the reverse direction mechanism transmits the reverse signal to the carriage motor when the carriage is moving in a forward direction and reaches a second end of the top of the table stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
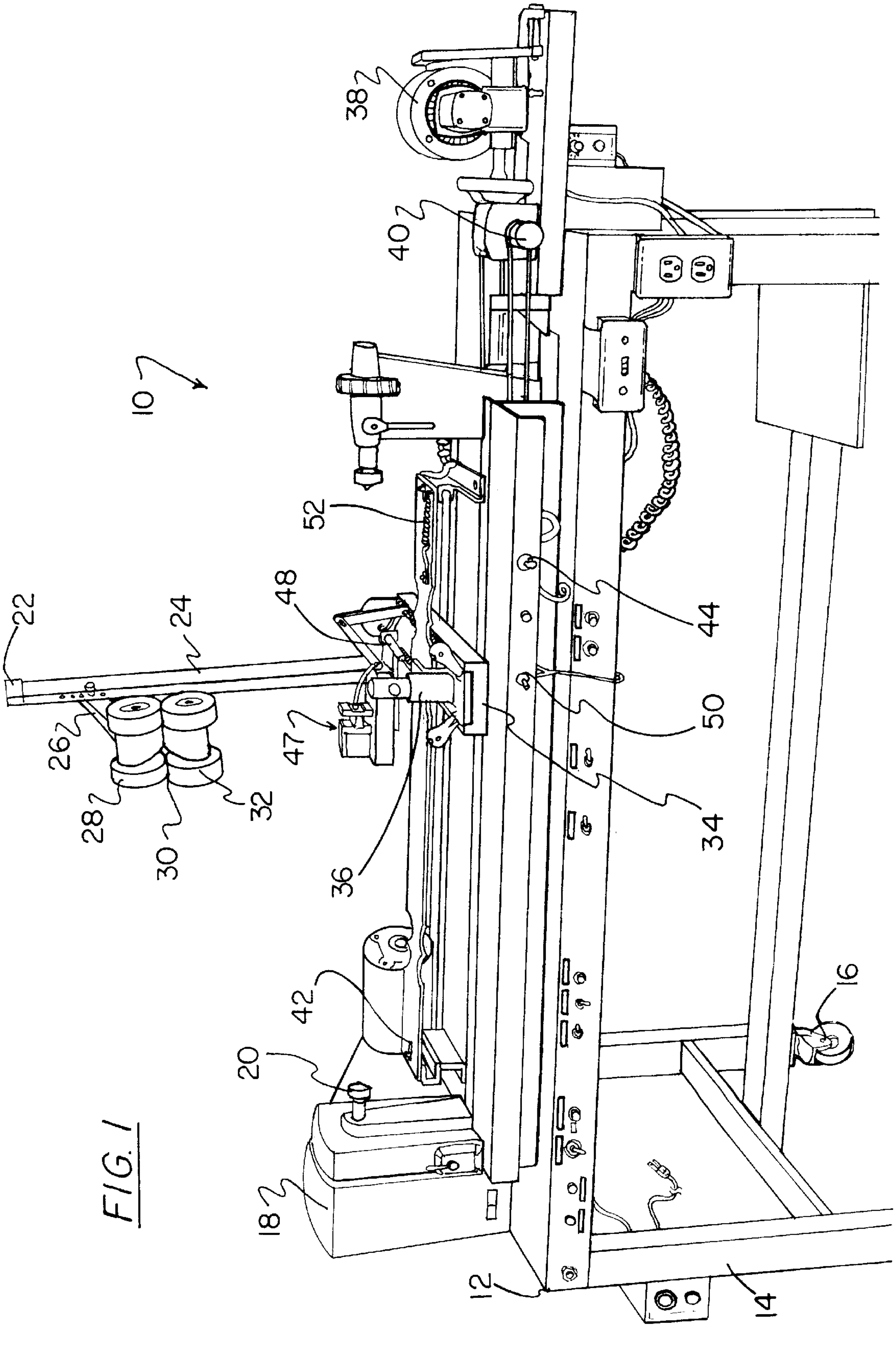
FIG. 1 is a perspective view of a new automatic spindle making device according to the present invention.
Figure 2:
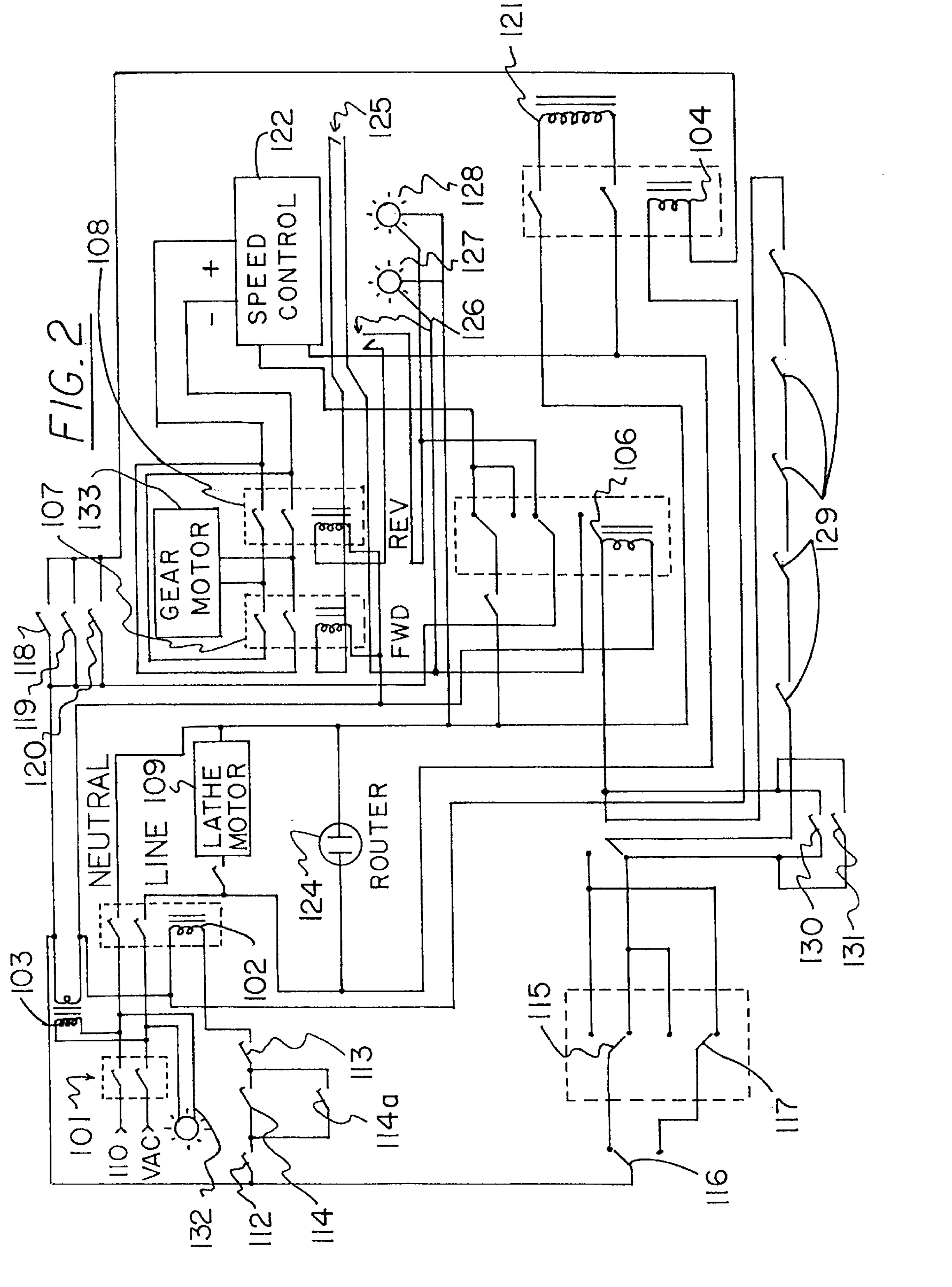
FIG. 2 is a schematic diagram of the present invention.
Figure 3:
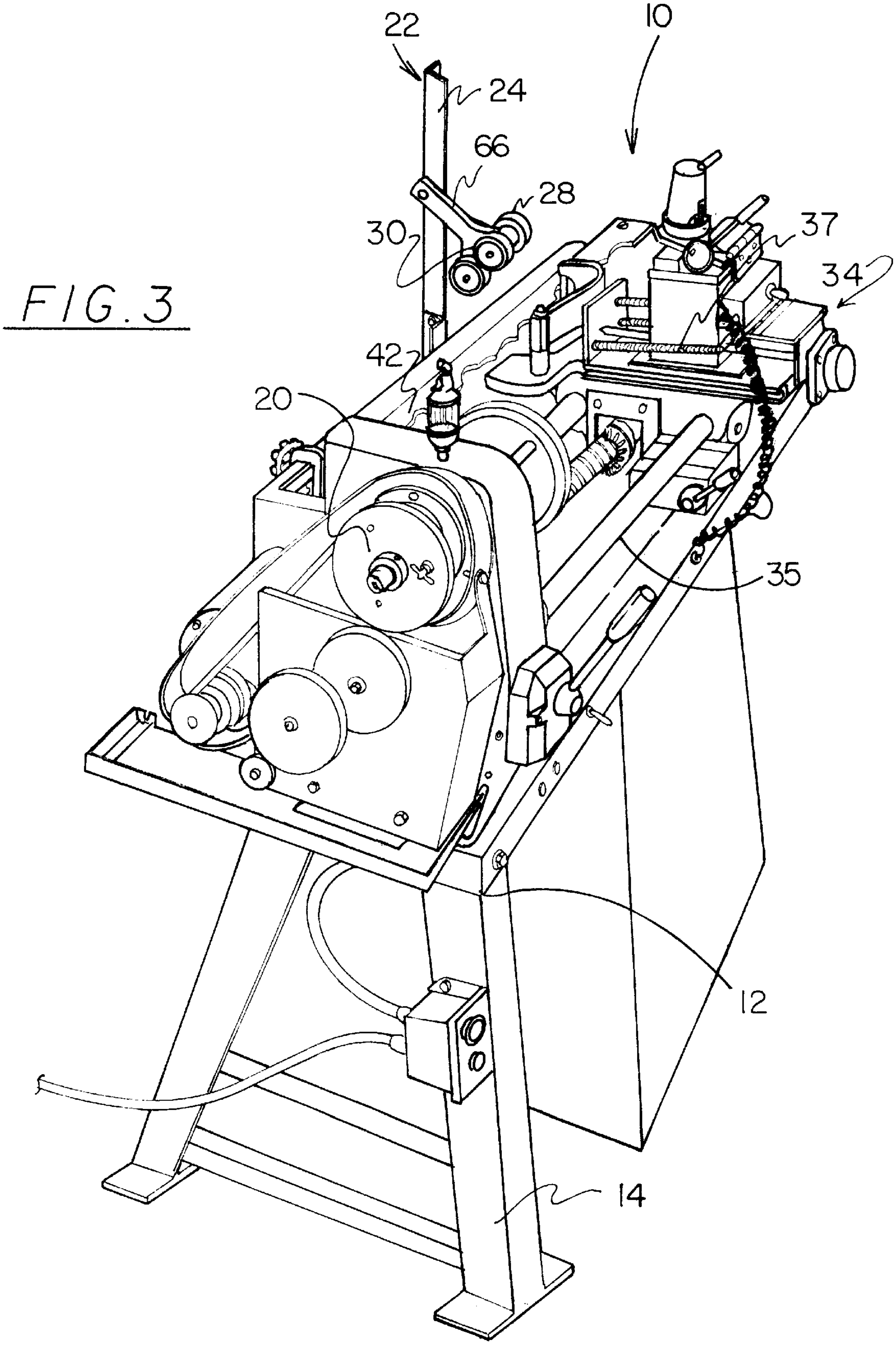
FIG. 3 is a side perspective view of the present invention.

With reference now to the drawings, and in particular to FIGS. 1 through 3 thereof, a new automatic spindle making device embodying the principles and concepts of the present invention and generally designated by the reference numeral 10 will be described.

The present invention, as designated as numeral 10, includes a table stand 12 having a rectangular planar top with a plurality of legs 14 coupled thereto and extending downwardly therefrom. As shown in FIG. 1, each leg has a wheel assembly 16 pivotally mounted to a bottom thereof. As an option, the stand may be equipped with drawers for storing various tools and other items.

Also included is a pair of spindle spinning assemblies 18 positioned on opposite ends of the top of the table stand. Each spindle spinning assembly has a securement rod 20 rotatably mounted thereon. During use, such securement rod is adapted to releasably secure to an end of a spindle for spinning the same when actuated. A gear box 20 is preferably associated with one of the spindle spinning assemblies for gear reduction purposes. Note FIG. 3.

With reference still to FIG. 1, a vibration damping assembly 22 is provided including an elongated linear arm 24 having a first end pivotally coupled to the top of the table stand. A second end of the arm has a member 26 coupled thereto and extending downwardly therefrom in perpendicular relationship therewith. The member has a bottom end with two pairs of wheels 28 rotatably mounted thereon. Each pair of wheels are spaced from the other pair of wheels and further define a groove 30.

During use, the arm may be lowered such that the groove of each pair of wheels receives the spindle and a weight of the arm damps vibration. It should be noted that each wheel of the vibration damping assembly has a thick soft rubber coating 32. Such coating functions for further damping vibration and accepting a spindle with an initial generally square cross-section.

Further provided is a carriage assembly 34 adapted to slide on a pair of elongated bars 35 extending between each spindle spinning assembly. The carriage assembly has a blade mechanism 36, or router, slidably mounted thereon for engaging a front surface of the spindle secured between the spindle assemblies. In operation, the blade mechanism is adapted to slide along an axis perpendicular with respect to the bar and direction of motion associated with the carriage assembly. A spring 37 is mounted between the carriage assembly and the blade mechanism such that the blade mechanism is continuously urged toward the spindle.

The carriage assembly further includes a carriage motor 38 adapted to move the carriage by way of a pulley 40 or a ball screw and ball nut combination. In use, the carriage motor moves the blade mechanism in a forward direction upon the receipt of a forward signal. Upon the receipt of a reverse signal, the motor moves the carriage in a reverse direction. It should be understood that the carriage motor only effects movement when the same is actuated.

FIG. 1 further shows a Plexiglas planar template 42 having a pair of curvilinear elongated side edges defining an outline of a unique spindle. The template is mounted in spaced horizontal orientation with respect to the top of the table stand such that an inboard end of the blade mechanism is in abutment with one the side edges of the template. Such abutments effects the distancing of the blade mechanism from the spindle in accordance with the outline of the side edge as the carriage assembly moves therealong. Preferably, the blade mechanism is equipped with a ball bearing assembly to slide smoothly along the template. By constructing the template from Plexiglas, wear is minimized. In use, the template is removable and may be remounted so that another one of the side edges may be placed in operative sliding abutment with blade mechanism of the carriage assembly. As such, each template is capable of forming spindles of two unique designs.

Also included is a reverse direction means located at opposite ends of the top of the table stand in line with the carriage assembly. During operation, the reverse direction means serves to transmit the forward signal to the carriage motor when the carriage is moving in a reverse direction and reaches a first end of the top of the table stand. In addition, the reverse direction means transmits the reverse signal to the carriage motor when the carriage is moving in a forward direction and reaches a second end of the top of the table stand.

As such, when the carriage motor is actuated, continuous reciprocation of the carriage assembly is afforded. As an option, a reverse direction manual switch 44 may be used to manually reverse the direction of the carriage assembly. A speed controller may also be employed to control a speed at which the carriage assembly moves along the bar.

For controlling the distance between the spindle and blade mechanism, an indexing assembly 47 is provided. Such indexing assembly includes a multi-position solenoid 48 fixedly mounted on the carriage assembly and in abutment with the blade mechanism. The solenoid is adapted for indexing the blade mechanism away from the spindle a predetermined distance upon the receipt of an index away signal. Upon the receipt of an index toward signal, the solenoid indexes the blade mechanism toward the spindle the predetermined distance. An manual index switch 50 may be used to manually transmit either of the indexing signals to the solenoid when desired by the user.

For providing fully automatic operation, an index toward signal is transmitted to the indexing assembly upon every transmission of at least one of the forward and reverse signal to the carriage motor, as when the carriage reverses direction. Such is accomplished by circuitry which will be described in great detail later.

Finally, a cut off switch 52 is mounted on the top of the table stand adjacent to one of the ends thereof. The cut off switch is adapted to deactuate the carriage motor and the spinning assemblies upon the abutment thereof with the blade mechanism when the blade mechanism resides in constant abutment with a full length of the template. In other words, the cut off switch is abutted when the blade mechanism reaches the maximum depth, as determined by the outline of the template.

To accomplish the aforementioned operation, circuitry is provided, as set forth in FIG. 2. A description of such circuitry and the various features associated therewith is as follows:

Master On/Off Switch

Push button magnetic switch 101. Controls all 120 VAC power source for entire Lathe, provides overload protection. When energized provides power to a double pole, single throw contactor, also provides 120 VAC to the transformer, 120 VAC primary/24 VAC secondary, rated 40 VA. Master On/Off is located on the extreme left front of the lathe.

Contactor

The double pole, single throw contactor 102, 24 VAC coil, is located in a control box, left side, beneath the bed of the lathe. The contactor coil is controlled by a normally closed series circuit, consisting of the left and right safety switches as well as the finish switch. Opening of any of these switches causes the contactor to open. This contactor, when energized and in a closed position provides 120 VAC power supply to a 120 VAC terminal block, it also provides the same voltage at the same time to the index relay.

Transformer

The 120/24 VAC transformer 103 is also located in the control box as the contactor. This transformer furnishes 24 VAC to the entire Control Circuit. The primary side 120 VAC of the transformer is energized at all times when the Master On/Off Switch is in the ON position. The control circuit consist of the Contactor, all Relays, Safety Switches, 3 and 4 Switches, Override Switches, Micro Switches Index, Left and Right, The minus (–) 24 VAC side of the transformer is directly connected to all Coils of the Double Pole, Double Throw Relays as well as the contactor. The plus (+) 24 VAC side of the transformer furnishes one (1) leg of the 24 VAC to the 24 VAC Terminal Block.

Index Relay

The Index Relay 104, double pole, double throw (24 VAC coil) is associated with the indexing assembly and located in the same control box as the contactor and transformer is located. The voltage source (120 VAC) for the contacts points of the Index Relay is provided when the Contactor is energized. When this relay is in the Closed Position it provides 120 VAC to the Indexing Solenoid. The 24 VAC Coil of the Indexing Relay is energized by a Momentary Left Micro Switch, Right Micro Switch and the Push Button Index Switch. All three (3) switches make a Series Circuit, by Closing any one of the switches causes the Index Solenoid to be energized, it should be noted, that each time one of these switches are closed (pushed) the Cutting Head is indexed one (1) time toward the wood that is being turned.

Cutting Head Travel Relays

Cutting Head Travel Relays consist of three (3) double pole/double throw relays, located in a control box right side beneath the bed of the lathe. I name these relays as follows, Master Travel Control Relay 106, Forward Travel Control Relay 107 and Reverse Travel Control Relay 108. Such relays are associated with the reverse direction means.

Master Travel Control Relay

The Master Travel Control Relay 106 has two (2) separate circuits feed through it. The 120 VAC is supplied to the contacts points on one pole of the relay from the Gear Motor On/Off toggle switch. The 120 VAC is feed through the relay in both the Closed and Open position (normally closed and opened contacts are jumped together) to the black (hot) wire of the Speed Controller . . . . It should be noted that this 120 VAC circuit could have come directly from the Gear Motor On/Off toggle switch without going through this relay, it was wired in this way for future control only.

The Second Pole of the Master Travel Control Relay 106 has 24 VAC supplied to it's Contact Points from the primary side of the 24 VAC Terminal Block. When the Master Travel Control Relay Coil is energized the N.O. Contacts provide power to the Coil of the Forward Travel Control Relay 107. When the Master Travel Control Relay Coil is de-energized the N.C. Contacts supplies 24 VAC to the Reverse Travel Control Relay 108 Coil. Note: The Coil of the Master Travel Control Relay is energized or de-energized by the 3 and 4 way switches 115, 116, 117.

Forward Travel Control Relay

Forward Travel Control Relay 107 is located in the same control box (below left) as the Master Control Travel Relay 106. The power Source for it's Contact Points is Maximum 90 VDC Plus (+) and (−). The Plus (+) wire is attached to the left hand pole, facing the relay, the Minus (−) on the right hand pole facing the relay. The DC Voltage is supplied to this relay from a Variable Speed Controller that changes 120 VAC to a variable DC Voltage from 0–90 VDC the amount of DC Voltage this relay receives in Manually set by the turning of a percent knob on the Speed Control.

The more DC Voltage supplied the faster the RPM of the DC Motor, therefore the faster the Cutting Head will travel. When the Coil is energized by the Master Travel Control Relay 106 (the second pole 24 VAC) a variable amount of DC voltage is supplied to the DC Gear Motor causing it to rotate in the Forward travel mode. Only the N.O. Contacts are used on this relay. The reason the N.C. Contacts are Not used to reverse rotation of the DC Motor is because contact points do not break as easily with DC current as AC current, should one set of the double pole points fail to make or break there would be a direct "Short".

Reverse Travel Relay

The Reverse Travel Relay 108 is located in the same control box as the Master Travel Control Relay 106 and the Forward Travel Control Relay 107 (lower right). The variable DC power source is furnished it's contact points from the Main Contact Points of the Forward Travel Control Relay. It MUST be noted that the Plus (+) wire coming from the Left Side Plus (+) on the Forward Travel Relay (facing it) is criss-crossed going to the Reverse Travel Control Relay 108. This wire attaches to the Right Contact Pole of the Reverse Travel Relay. The Minus (−) wire, Right Side, from the Forward Travel Relay is attached to the Left Contact Pole of the Reverse Travel Relay. Note: When the Master Travel Control Relay Coil is de-energized and it's contact points are in he N.C. position it energizes the Reverse Travel Relay. This reverses the two (2) lead wires (criss-crosses) of the Gear Motor causing the DC Motor to reverse rotation.

Lathe Motor

The Lathe Motor 109 is located at the left rear of the lathe. It provided variable speed to a turning using step-up and step-down pulleys.

120 VAC Terminal Block

The 120 VAC Terminal Block 110 is located midway beneath the bed of the lathe, to the rear. It should be noted that both Black (hot) and White (neutral) feed through the block.

24 VAC Terminal Block

The 24 VAC Terminal Block 111 is located midway beneath the bed of the lathe (to the front). It should be noted that only the Plus (+) side of the 24 VAC circuit goes through the block. The block has a secondary circuit used to control the Index Relay through the Left Micro Index, Right Micro Index and the Push Button Index Switch.

Left Push Button Momentary Safety Switch

The Left Push Button Momentary Safety Switch 112 is located on the Head Stack Housing. Should the Left 3 Way Switch fail and the Cutting Head continue to travel toward the head stock the Cutting Head would contact the Push Button Left Safety Switch, opening the normally closed series circuit to the Contactor, stopping all lathe operations. The 120/24 VAC transformer would be energized at this time, however no operations could be performed in that the 24 VAC is for control circuit only.

Right Push Button Momentary Safety Switch

The Right Push Button Momentary Safety Switch 113 is located on the trail Stock Housing, should the Right 3 way Switch fail and the Cutting Head continue travel toward the Tail Stock the Cutting Head would contact the Right Safety Switch with the same reaction as the Left Safety Switch.

Finish Switch

The Finish Switch 114, or cut off switch, is a micro push button momentary switch located on the Plexiglas template being used to turn a spindle or what ever. It is normally located at the deepest cutting point on the template. When the feeler roller of the cutting head touches the Finish Switch all operations are ceased as with pushing the right or left safety switches. It should be noted however, that the override toggle switch located on the front edge o f the lathe, when in the closed position will permit operation to continue, should the turning need an additional stroke or so. The toggle over ride DOES NOT override the left and/or right Safety Switches.

Left 3 Way Push On-Push Off Reversing Switch

The Left 3 Way Push On-Push Off Reversing Switch 115 is associated with the reverse direction means and located on the Rear Head Stock Housing. When the Cutting Head travels toward the Head Stock an adjustable rod located on the rear of the cutting head makes contact with the Left 3 Way Switch (reversing) causing it to energize or de-energize as the case might be therefore it causes the Master Travel Control Relay to energize or de-energized causing the DC Gear Motor to reverse rotation.

Right 3 Way Push On-Off Reversing Switch

The Right 3 Way Push On-Push Off Reversing Switch 116 is associated with the reverse direction means and located on the Rear of the Tail Stock Housing. When the Cutting Head Travels toward the Tail Stock adjustable rod located on the rear base of the Cutting Head makes contact with the Right 3 Way Push Button Reversing Switch and react in the same manner as the left 3 way push button reversing switch reacts.

4 Way Toggle Reversing Switch

The 4 Way Toggle Reversing Switch 117 is located on the front edge of the lathe bed, by changing the position of the toggle it causes the two (2) wires extending from the left 3 way through the 4 way to the right 3 way to cross-cross causing the DC Motor to reverse rotation manually. It should be noted that the power source (24 VAC) is supplied from the primary pole of the 24 VAC terminal block to the left 3 way switch, through the 4 way switch, and through the right 3 way switch, then to the Load of the Coil of the Master Travel Control Relay. The present reversing switch is associated with the reverse direction means.

Left Micro Momentary Push button Index Switch

The Micro Momentary Push Button Index Switch 118 (left) is a component of the indexing assembly and located on the Plexiglass template. It is positioned near the left end where the template withdraws the cutting head from the wood but prior to contacting the left 3 way reversing switch. The gage roller on the cutting head makes contact with the index switch, indexing one (1) time, then makes contact with the index switch once more, therefore the cutting head is indexed twice at the end of each stroke. Power is supplied from the primary pole of the 24 VAC Terminal Block to the left Index Switch also the Momentary Manual Push Button Switch and the right Index Switch. The Load wire of the Left Index Switch is routed through the Secondary Pole of the 24 VAC Terminal Block, then to the coil of the index relay causing the Index Solenoid to energize when the index switch is closed.

Manual Momentary Push Button Index Switch

The Manual Momentary Push Button Index Switch 119 is a component of the indexing assembly and located on the front edge of the lathe bed, and is wired as the left index switch.

Right Micro Momentary Push Button Index Switch

The right Micro Momentary Push Button is a component of the indexing assembly. Index Switch 120 is located on the Plexiglass template. It is positioned near the right end where the template withdraws the cutting head from the wood but prior to contacting the right 3 way reversing switch, much the same as the left micro index.

Indexing Solenoid

The multi-position Indexing Solenoid 121 is located on the cutting head. It is furnished 120 VAC current from the indexing relay (when energized). The Solenoid is attached to a ratchet on a threaded rod. When the solenoid is energized the threaded rod is turned counter-clockwise moving the cutting head closer to the wood being turned in a predetermined amount.

Speed Controller

The Speed Controller 122 is located right end of lathe below the DC Gear Motor. 120 VAC is supplied the primary side of the Speed Controller when the Contactor is in the closed position. The Secondary side supplies 0–90 VDC to the Forward and Reverse Travel Relays using a variable manual control knob located on the controller DC Gear Motor The DC Gear Motor 133 is located right end of lathe and receives the power for the load from the Forward Travel Relay or the Reverse Travel Relay depending on the direction of travel. The Gear Motor rotates a acme threaded shaft to move the cutting head.

Router Receptacle (120 VAC)

The Router Receptacle 124 (120 VAc) is located left of the Speed Controller, energized when the Contactor is in a closed position for Router Control.

Master On-Off—Push Button Magnetic Switch

Contactor—2 PNO 24 VAC Coil 25 Amp

Transformer—120 VAC Primary, 24 VAC Secondary, 40 VA

Relays—(All) Such as the Mars 90340 Switch Relay Contacts Power-Power DPDT 24 VAC Coil 3 way Switches—Mini SPDT Push On-Push Off Rated 3 Amp 120V 4 Way Switch—Toggle DPDT Rated 10 Amps at 120V Micro Index and Finish Switches—Snap Action Miniature type Granger Part #6X291

Safety Switches—SPST Momentary Push Button

Solenoid—Granger Part #4X317 120V Coil 1¼" Stroke

Gear Motor—90 VDC, 89 RPM at full load Granger part#4Z728

Speed Controller—Granger Part #5X412 Filtered Controller

Lathe Motor Gear Motor and Override On/Off Switches—Toggle SPST Flat lever type.

No Travel Left (Forward)

This is a toggle switch 125 SPST is normally in. the closed position (N.C.). When opened the carriage will not move to left. Used for indexing wood piece. Example: When carriage is traveling to right, reaches destination, reverses the carriage stops permitting wood piece to be indexed, after indexing wood piece move switch to closed position for continued operation. Located on front of lathe between left travel light and lathe motor switch.

No Travel Right (Reverse)

This is a toggle switch 126 SPST is normally in closed position (N.C.). When opened the carriage will no move to right. Used for indexing wood piece. Example: When carriage is traveling to left, reaches destination reverses the carriage, stops, permitting wood piece to be indexed, after indexing wood piece move switch to closed position for continued operation. Located on front of lathe between reversing switch and right travel indicator light.

Left Travel Indicator Light

This light 127 indicates direction carriage will travel when energized. Located on front of lathe between master on indicator light and no travel right switch.

Right Travel Indicator Light

The present light 128 indicates direction carriage will travel when energized. Located on front of lathe extreme right ride, right of the no travel left toggle switch.

Stop Switches (N.C.)

Momentary push button switches 129. When in open position causes carriage to stop. (Can be overridden with stop override switch.) Located on template at desired stop location, as many in number as stops desired. Is a series circuit from source to gear motor.

Stop Override Switch SPST N.O.

Toggle switch 130 in normally open position. When in closed position and Half-Nut disengaged, permits spindle to turn with no carriage movement. (For cutting straight around spindle) located on front of lathe between momentary override push button switch and manual reversing switch.

Momentary SPST Push Button Switch (See #129) to continue to next stop switch 131. Located on front of lathe between finish override and stop override switches.

Master On Indicator Light

The instant light 132 indicates that master on/off switch is in the position. Located in front of lathe, extreme left—left of left travel indicator light.

The lathe of the present invention is approximately six feet in length, has a base width of twenty-four inches, and stands approximately forty-eight inches tall. Built into the lathe stand are two drawers, and one storage cabinet. In use, the present invention has the basic functions of a standard lathe, permitting the use of hand held wood turning chisels, faceplate turnings, bowl turning, rest etc. It also has the capability of making quick work of reproducing spindles, post, and much more, completely automatically. It follows outlines of original turning or template to professionally duplicate piece. The present invention makes spindles up to 39 in. long, 4 in. diameter. There is no need for chisels or intricate measuring, in that it follows the template or original turning using a steel cutting knife or a trim router (small) to do the cutting.

This lathe also functions as an ornamental turning lathe. When used with the (trim) small router the lathe allows the operator to do much more than is possible with an ordinary spindle turning lathe. It is capable of making distinctive turnings of all kinds, including candlesticks, lamps or table leg, it will bead, flute, spiral, roping, and twists (either right or left) in paralleled or tapered configurations. The size and shape of the beading, fluting coves, flats, roping or spiraling-both left and right-hand are determined by the cutting shape of the router bit used.

It should be noted all these operations are done completely automatically, with the exception of hand held chisels. The built-in indexing head is used in conjunction with straight beading, fluting, roping or spiraling. These basic routing and turning techniques used in combination with one another will result in hundreds of design configurations. It should be pointed out that the present lathe is a heavy-duty production machine. It is so designed that is will provide hours of fun and entertainment for the hobbyist woodworker as well as a full-time production machine for the professional woodworker.

This 14 in., 1½ HP lathe consists of a cast-iron head connection, the cast-iron tailstock with two (2) 1½ in. rods approximately 54 in. in length. A cast-iron carriage is located to slide (travel) on the two rods by means of a acme 1–4" pitch rod, the length of the lathe bed. Mounted on this carriage platform is a metal blade cutting device or a trim (small) router head.

The movement of this cutting carriage is provided by a right angle 90 VDC gear motor having a name plate RPM of 89, F/L torque in.-lb. 34, 1/10 HP, with gear ratio of 37:1. This DC Variable Speed Control, enclosed type with input voltage 120 VAC, output 90 VDC Speed Range 50:1.

The 1" Acme Rod (threaded) travels through the cutting platform/carriage where there is located a half-nut engaging device, lever controlled, by movement of the lever on the half-nut engaging device it will cause the carriage to stop or move when the Acme Rod is turning. This permits the gear motor to be energized (turning) with or without carriage movement.

The 1" Acme threaded rod exceeds into the housing of the headstock and attaches to three (3) 2" diameter steel miter gears. Two of the miter gears are notched and horizontally mounted, face to face to each other on the end of the acme rod while the third miter gear is positioned between the other two at right angle to the two that are horizontally mounted on the end of the acme rod. The two horizontal mounted gears are free-wheeled on the acme rod while the third angle miter gear is attached and keyed to a ½" shaft that extends through the rear side of the headstock housing.

There is a notched device located between the two notched horizontally mounted miter gears that is so designed to slide while being keyed to the acme rod—when this notched, lever controlled, is moved to left or right it will engage one of the miter gears causing the output shaft extending out of the back side of the headstock housing to reverse rotation. It should also be noted that when the notched device is located in the center (between the mitered gears) there will be no movement of the output shaft.

To continue with the working of the output shaft extending to the rear of the headstock housing, this ½" shaft is then attached to two more miter gears approx. 1" diameter intersecting shaft position at right angle. This will cause the output shaft to turn 90 degrees left into a gear box, consisting of seven (7) reduction spur gears. The last reduction gear is attached to the main headstock step-belt pulley by means of a indexing holes drilled into the outside where the last reduction gear mates with it by engaging the indexing pin.

The reduction gears cause the face plate to turn at a ratio 1:27. This means that the acme threaded rod will turn 27 times causing the face plate to turn one (1) turn.

It should be noted that while using the reduction gears for turning, all power for movement of the carriage as well as the spindle itself is provided by the DC gear motor. The main 1½ HP 120 VAC motor is de-energized at this time. The cutting of the spindle is provided by the trim router. For quick work of reproducing spindles the main 1½ HP 120 VAC motor is used to turn the faceplate or spur as the case might be. The variable controlled DC gear motor provides travel in both directions of the cutting carriage.

The contour of the spindle is provided by a template or a original turning. Located on the template at its deepest point is a N.C. micro switch when the roller of the feeler mechanism of the cutting head touches this switch, it opens and causes all lathe operation to cease. There is an override switch to override this switch should the operator wish to continue the turning operation.

The lathe has angled brackets located to the rear of the 1½ rods extending the full length of the 1½" rods. Located on this angled bracket is quick position left and right reversing switches, (red button), next to these switches, inside, both ends, are located the indexing switches, then between these switches are located stop micro switches (N.C.) are located at predetermined points. These switches may be as many as there is desired points to stop. These switches create a series circuit to the gear motor, when any one of these switches open the gear motor de-energizes, causing the carriage to stop movement. Example: Switch opens, carriage stops disengage half-nut—insert desired router bit—position lever on router elevation to up position—turn on stop override switch—gear motor energizes—release router elevation position lever—make circle cut—turn off stop override—engage half-nut to acme threaded rod—raise position lever—press momentary button switch the cutting head moves off the stop switch and continue to next stop switch. The cutting head is spring loaded and causes the head to be pulled toward the wood work piece. It has a flat bar that has a roller that rolls against the template. This flat bar engages a ¼x¼ square threaded rod which protrudes through the cutting head and is attached to a cam rod attached to a reversible synchronous gear motor. Each time this gear motor is energized the threaded square rod moves the cutting head closer to the wood that is being turned. This gear motor has a reversing switch to move the cutting head away from the spindle upon completion of the turning.

Located beside the threaded square rod is a all thread rod. This rod also engages the flat bar (with roller) and may be set for maximum depth of cut. (to prevent over cutting) The cutting head mechanism has attached to it a vacuum port. The template holder bracket located to the rear of the lathe that aligns the template holder and may be positioned to accept any length template up to maximum the lathe will handle. On this template holder bracket is also mounted a set of anti-vibration rollers used when turning long spindles an using the steel cutting knife. The anti-vibration rollers are not required when using the router to do the cutting in that the router cuts horizontally not vertical as the steel knife cuts.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An automatic lathe system comprising, in combination:

a table stand having a rectangular planar top with a plurality of legs mounted to the top and extending downwardly from the top, each leg having a wheel assembly pivotally mounted to a bottom of the leg;

a pair of spindle spinning assemblies positioned on opposite ends of the top of the table stand, each spindle spinning assembly having a securement rod rotatably mounted thereon and releasably secured to an end of a spindle for spinning the spindle;

a vibration damping assembly including an elongated linear arm having a first end pivotally coupled to the top of the table stand and a second end having a member coupled to the second end and extending downwardly the arm in a perpendicular relationship with the arm, the member having a bottom end with two pairs of wheels rotatably mounted thereon, each pair of wheels spaced from the other pair of wheels to define a groove, wherein the arm may be lowered such that a spindle mounted between the spindle spinning assemblies engages the groove defined by the pairs of wheels and a weight of the arm damps vibration, each wheel of the vibration damping assembly having a thick soft rubber coating for further damping vibration and further accepting a spindle with an initial generally square cross-section;

a carriage assembly being adapted to slide on at least one elongated bar extending between each spindle spinning assembly, the carriage assembly having a blade mechanism mounted thereon for engaging a front surface of the spindle secured between the spindle assemblies, the blade mechanism being slidable along an axis perpendicular with respect to the bar and direction of notion associated with the carriage assembly such that the blade mechanism is continuously urged toward the spindle, the carriage assembly further including a carriage motor for moving the carriage by way of a pulley in a forward direction upon the receipt of a forward signal and move the carriage in a reverse direction upon the receipt of a reverse signal only when the carriage motor is actuated;

a plastic planar template having a pair of curvilinear elongated side edges defining an outline of a unique spindle, the template mounted in spaced horizontal orientation with respect to the top of the table stand such that an inboard end of the blade mechanism is in sliding abutment with one the side edges of the template and distanced from the spindle in accordance with the outline of the side edge as the carriage assembly moves along the template. wherein the template is removable and remounted so that another one of the side edges may be placed in operative sliding abutment with blade mechanism of the carriage assembly;

reverse direction means located at opposite ends of the top of the table stand in line with the carriage assembly, the reverse direction means transmitting the forward signal to the carriage motor when the carriage is moving in a reverse direction and reaches a first end of the top of the table stand, the reverse direction means transmitting the reverse signal to the carriage motor when the carriage is moving in a forward direction and reaches a second end of the top of the table stand;

an indexing assembly including a multi-position solenoid fixedly mounted on the carriage assembly and in abutment with the blade mechanism for indexing the blade mechanism away from the spindle a predetermined distance upon the receipt of an index away signal and further indexing the blade mechanism toward the spindle the predetermined distance upon the receipt of an index toward signal, wherein an index toward signal is transmitted to the indexing, assembly upon every transmission of at least one of the forward and reverse signal to the carriage motor, as when the carriage reverses direction;

a cut off switch mounted on the top of the table stand adjacent to one of the ends of the top for deactuating the carriage motor and the spinning assemblies upon the abutment of the blade mechanism with one of the spinning assemblies when the blade mechanism resides in constant abutment with a full length of the template.

2. An automatic lathe system comprising:

a table stand having a top with a plurality of legs coupled thereto and extending downwardly therefrom;

a pair of spindle spinning assemblies positioned on the top of the table stand, each spindle spinning assembly having a securement rod rotatably mounted thereon and releasably secured to an end of a spindle for spinning the spindle;

a carriage assembly adapted to slide between each spindle spinning assembly, the carriage assembly having a blade mechanism mounted on the carriage assembly for engaging a front surface of the spindle secured between the spindle assemblies, the carriage assembly further including a carriage motor for moving the carriage in a forward direction upon the receipt of a forward signal and moving the carriage in a reverse direction upon the receipt of a reverse signal and only when the carriage motor is actuated; and reverse direction means transmitting the forward signal to the carriage motor when the carriage is moving in a reverse direction and reaches a first end of the top of the table stand, the reverse direction means transmitting the reverse signal to the carriage motor when the carriage is moving in a forward direction and reaches a second end of the top of the table stand.

3. An automatic lathe system as set forth in claim 2 additionally comprising at least one elongated bar extending between the spindle spinning assemblies, and wherein the blade mechanism is slidable along an axis perpendicular with respect to the bar and direction of motion associated with the carriage assembly such that the blade mechanism is continuously urged toward the spindle.

4. An automatic lathe system as set forth in claim 3 additionally comprising a planar template having a curvilinear elongated side edge defining an outline of a spindle pattern, the template being mounted in a horizontal orientation such that an inboard end of the blade mechanism is in abutment with one of the side edges of the template.

5. An automatic lathe system as set forth in claim 3 and further including a cut off switch for deactuating the carriage motor and the spinning assemblies upon the abutment of the blade mechanism with the spinning assemblies when the blade mechanism resides in constant abutment with a full length of the template.

6. An automatic lathe system as set forth in claim 4 wherein the planar template is formed of a substantially transparent plastic material.

7. An automatic lathe system as set forth in claim 4 wherein the template has a pair of elongated side edges each having a unique outline pattern of a spindle, wherein the template is removable and remountable so that another one of the side edges may be placed in operative sliding abutment with blade mechanism of the carriage assembly.

8. An automatic lathe system as set forth in claim 2 and further including an indexing assembly in abutment with the blade mechanism for indexing the blade mechanism away from the spindle a predetermined distance upon the receipt of an index away signal and further indexing the blade mechanism toward the spindle the predetermined distance upon the receipt of an index toward signal.

9. An automatic lathe system as set forth in claim 8 wherein an index toward signal is transmitted to the indexing assembly upon every transmission of at least one of the forward and reverse signals to the carriage motor, as when the carriage reverses direction.

10. An automatic lathe system as set forth in claim 2 and further including a vibration damping assembly.

11. An automatic lathe system as set forth in claim 10 wherein the vibration damping assembly includes at least one pair of wheels rotatably mounted, each pair of wheels being spaced from the other pair of wheels to define a groove for engaging the spindle.

12. An automatic lathe system as set forth in claim 11 wherein each wheel of the vibration damping assembly has a thick soft rubber coating for further damping vibration.

13. An automatic lathe system as set forth in claim 11 wherein the vibration damping assembly includes an elongated arm having a first end pivotally coupled to the top of the table stand.

14. A lathe system comprising:

a pair of longitudinally spaced spindle spinning assemblies each being securable to an end of a piece of spindle stock for spinning the spindle stock;

a carriage assembly movable longitudinally between the spindle spinning assemblies, the carriage assembly including a carriage motor for moving the carriage in a forward direction upon the receipt of a forward signal and moving the carriage in a reverse direction upon the receipt of a reverse signal and only when the carriage motor is actuated;

a blade mechanism mounted on the carriage assembly for engaging a front surface of the spindle stock secured between the spindle assemblies;

an elongate planar template extending longitudinally and having a contoured side edge defining an longitudinally of a spindle pattern. the template being mounted in a substantially horizontal orientation such that an inboard end of the blade mechanism is abuttable against one of the side edges of the template;

reverse direction means transmitting the forward signal to the carriage motor when the carriage is moving in a reverse direction and reaches a first end of the top of the table stands the reverse direction means transmitting the reverse signal to the carriage motor when the carriage is moving in a forward direction and reaches a second end of the top of the table stand; and a vibration damping assembly comprising at least one wheel and a wheel supporting assemble for rotatably supporting the wheel in a abutted condition against the spindle stock, the wheel having a soft exterior surface for absorbing vibration from the spindle stock.

15. An automatic lathe system as set forth in claim 14 additionally comprising an indexing assembly in abutment with the blade mechanism for indexing the blade mechanism away from the spindle stock a predetermined distance upon the receipt of an index away signal and further indexing the blade mechanism toward the spindle stock the predetermined distance upon the receipt of an index toward signal.

16. An automatic lathe system as set forth in claim 14 wherein the vibration damping assembly includes two pairs of wheels rotatably supported on the wheel supporting assembly, each pair of wheels being spaced from the other pair of wheels to define a groove for engaging the spindle stock.

17. An automatic lathe system as set forth in claim 14 wherein the wheel supporting assembly includes an elongated arm having a first end pivotally mounted for swinging toward and away from spindle stock mounted between the spindle spinning assemblies.

* * * * *